United States Patent
McDermott (10) Patent No.: US 9,946,573 B2
(45) Date of Patent: Apr. 17, 2018

(54) OPTIMIZING VIRTUAL MACHINE MEMORY SIZING FOR CLOUD-SCALE APPLICATION DEPLOYMENTS

(71) Applicant: Oracle International Corporation, Redwood Shores, CA (US)

(72) Inventor: Christopher M. McDermott, Orlando, FL (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 14/717,290

(22) Filed: May 20, 2015

(65) Prior Publication Data
US 2016/0342443 A1    Nov. 24, 2016

(51) Int. Cl.
G06F 9/455    (2018.01)
G06F 9/50    (2006.01)
G06F 12/02    (2006.01)

(52) U.S. Cl.
CPC ........ *G06F 9/5016* (2013.01); *G06F 9/45558* (2013.01); *G06F 12/023* (2013.01); *G06F 2009/45583* (2013.01); *G06F 2209/501* (2013.01); *G06F 2212/1044* (2013.01)

(58) Field of Classification Search
None
See application file for complete search history.

(56) References Cited

U.S. PATENT DOCUMENTS

| | | | |
|---|---|---|---|
| 7,979,857 B2* | 7/2011 | Esfahany | G06F 9/5016 709/226 |
| 8,352,608 B1* | 1/2013 | Keagy | G06F 8/63 709/220 |
| 8,706,798 B1* | 4/2014 | Suchter | G06F 9/5038 709/202 |
| 8,825,550 B2* | 9/2014 | Marr | G06F 9/45533 705/52 |
| 9,323,552 B1* | 4/2016 | Adogla | G06F 9/45533 |
| 9,553,827 B2* | 1/2017 | Ashby, Jr. | H04L 47/78 |

(Continued)

OTHER PUBLICATIONS

Shen et al., "CloudScale: Elastic Resource Scaling for Multi-Tenant Cloud Systems", SOCC, Oct. 28, 2011, Portugal; Copyright 2011 ACM; North Carolina State University and Google (Shen_2011.pdf; pp. 1-14).*

(Continued)

*Primary Examiner* — Hiren Patel
(74) *Attorney, Agent, or Firm* — Trellis IP Law Group, PC (57) ABSTRACT

A system and method for facilitating allocation of computing resources, such as addressable memory, to virtual machines in a networked computing environment. An example method includes ascertaining a first set of information characterizing one or more computing resources of the computing environment, wherein the first set of information includes information indicating allocable memory in the computing environment; determining a set of memory allocation rules applicable to the one or more virtual machines and the computing environment; and employing the first set of information and the set of memory allocation rules to automatically generate and optionally implement one or more indications or recommendations for adjusting existing memory allocations in accordance with the memory allocation rules.

19 Claims, 7 Drawing Sheets

(56) References Cited

U.S. PATENT DOCUMENTS

| | | | |
|---|---|---|---|
| 9,619,263 B2* | 4/2017 | Broas | G06F 9/45558 |
| 2004/0250248 A1* | 12/2004 | Halpern | G06F 9/505 |
| | | | 718/100 |
| 2005/0223377 A1* | 10/2005 | Galal | G06F 9/45533 |
| | | | 718/1 |
| 2009/0070776 A1* | 3/2009 | Dahlstedt | G06F 9/5016 |
| | | | 719/312 |
| 2009/0210527 A1* | 8/2009 | Kawato | G06F 9/45558 |
| | | | 709/224 |
| 2010/0161929 A1* | 6/2010 | Nation | G06F 9/5016 |
| | | | 711/170 |
| 2010/0169536 A1* | 7/2010 | Shedel | G06F 9/45558 |
| | | | 711/6 |
| 2010/0205395 A1* | 8/2010 | Srinivasan | G06F 9/45558 |
| | | | 711/170 |
| 2011/0138147 A1* | 6/2011 | Knowles | G06F 9/5016 |
| | | | 711/170 |
| 2013/0055252 A1* | 2/2013 | Lagar-Cavilla | G06F 9/5077 |
| | | | 718/1 |
| 2013/0104125 A1* | 4/2013 | Sarma | G06F 21/10 |
| | | | 718/1 |
| 2013/0167147 A1* | 6/2013 | Corrie | G06F 9/45533 |
| | | | 718/1 |
| 2013/0205297 A1* | 8/2013 | Shimogawa | G06F 9/45558 |
| | | | 718/1 |
| 2013/0283273 A1* | 10/2013 | Miyazaki | G06F 9/45533 |
| | | | 718/1 |
| 2013/0346969 A1* | 12/2013 | Shanmuganathan | G06F 9/4856 |
| | | | 718/1 |
| 2014/0019972 A1* | 1/2014 | Yahalom | H04L 67/1097 |
| | | | 718/1 |
| 2014/0058871 A1* | 2/2014 | Marr | G06F 9/45533 |
| | | | 705/26.1 |
| 2014/0082201 A1* | 3/2014 | Shankari | H04L 47/70 |
| | | | 709/226 |
| 2014/0089917 A1* | 3/2014 | Attalla | G06F 9/455 |
| | | | 718/1 |
| 2014/0137110 A1* | 5/2014 | Engle | G06F 9/5022 |
| | | | 718/1 |
| 2014/0143516 A1* | 5/2014 | Dawson | G06F 12/0253 |
| | | | 711/171 |
| 2014/0196049 A1* | 7/2014 | Bobroff | G06F 9/45558 |
| | | | 718/104 |
| 2014/0201371 A1* | 7/2014 | Gupta | G06F 9/45558 |
| | | | 709/226 |
| 2014/0201732 A1* | 7/2014 | Haag | G06F 9/45533 |
| | | | 718/1 |
| 2014/0245301 A1* | 8/2014 | Cheng | G06F 17/30076 |
| | | | 718/1 |
| 2014/0258670 A1* | 9/2014 | Venkatasubramanian | G06F 12/023 |
| | | | 711/171 |
| 2014/0324924 A1* | 10/2014 | Ahad | G06F 12/0253 |
| | | | 707/813 |
| 2014/0365816 A1* | 12/2014 | Antony | G06F 9/45558 |
| | | | 714/6.11 |
| 2015/0026429 A1* | 1/2015 | Bobroff | G06F 12/0253 |
| | | | 711/171 |
| 2015/0039764 A1* | 2/2015 | Beloglazov | H04L 47/70 |
| | | | 709/226 |
| 2015/0142908 A1* | 5/2015 | Sun | G06F 9/455 |
| | | | 709/213 |
| 2015/0156095 A1* | 6/2015 | Lu | H04L 47/70 |
| | | | 709/224 |
| 2015/0363133 A1* | 12/2015 | Bobroff | G06F 9/45529 |
| | | | 711/170 |
| 2015/0365349 A1* | 12/2015 | Verma | H04L 67/1008 |
| | | | 709/226 |
| 2016/0103717 A1* | 4/2016 | Dettori | G06F 9/542 |
| | | | 719/318 |
| 2016/0249079 A1* | 8/2016 | Malone | H04N 21/234309 |

OTHER PUBLICATIONS

Van et al., "SLA-aware Virtual Resource Management for Cloud Infrastructures", IEEE Ninth International Conference on Computer and Information Technology, copyright 2009 IEEE; (Van_2009.pdf; pp. 1-6).*

SQL Server Query Tool; http://www.orafaq.com/wiki/SGA_target; Mar. 2011, 2 pages.

* cited by examiner

OPTIMIZING VIRTUAL MACHINE MEMORY SIZING FOR CLOUD-SCALE APPLICATION DEPLOYMENTS

BACKGROUND

The present application relates to computing and more specifically to software and associated systems and method for facilitating determining, adjusting, and/or analyzing allocation of or configuration of computing resources in a computing environment.

Software for facilitating computing resource allocation is employed in various demanding applications, including desktop operating system software for coordinating the sharing of Random Access Memory (RAM) among running software applications, and distributed software application component memory allocation in networked computing environments, such as cloud-based enterprise computing environments. Such applications often demand cost-effective user friendly mechanisms for facilitating allocating computing resources so as to mitigate program errors, improve system performance, enable efficient utilization of resources, and so on.

Mechanisms for facilitating efficient computing resource allocation e.g., allocation of RAM, are particularly important in enterprise computing environments, where a given software application may be implemented via thousands of virtual machines running on one or more server clusters, complicating virtual machine memory allocation or sizing tasks.

In general, virtual machines, e.g., Java Virtual Machines (JVMs), which may be software-based representations or implementations of computer systems, are often employed in enterprise computing environments that employ cloud services to deploy software applications for use by customers. Such environments may include many servers and accompanying JVMs spread across multiple datacenters serving thousands of customers.

Enterprise application architectures often require multiple JVM processes colocated and running in tandem on the same host or virtual host. Determining the optimal sizing and configuration of the virtual machines can be a complicated, yet critical task for ensuring optimal use of available primary memory resources; optimal application performance given available resources; and robust system stability in relation to memory utilization and the impact of process swapping.

Determining and setting appropriate virtual machine sizing (i.e., determining the amount of RAM to be allocated for use by a virtual machine) can be a major operational challenge for enterprises wishing to improve or optimize memory utilization and reduce risks of memory over allocation, under allocation, and system instability.

Conventionally, virtual machines are often initially provisioned (for use by customers of cloud services in an enterprise computing environment) with relatively small default memory sizes. The default memory sizes are often not changed after initial provisioning and use. However, this can lead to sub-optimal use of computing resources and associated errors.

Alternatively, initially sized virtual machines are resized manually during provisioning or implementation of software included in the computing environment. However, such virtual machine resizing is often problematic, also resulting in poor resource utilization, application errors, and/or performance degradation issues.

In general, enterprise system and application administration organizations may lack sufficient combined knowledge, experience, and/or statistical data to accurately, consistently and rapidly determine and implement optimum virtual machine sizing and configurations. Such configurations can be time consuming and costly to establish and deploy, and once deployed, any non-optimal JVM sizing may result in underutilization of expensive computing resources, poor application performance and/or system instability, and so on.

Hence, conventional approaches to virtual machine sizing can be prohibitively costly and time consuming and may lead to memory over utilization or underutilization and associated errors and/or application performance degradation.

SUMMARY

An example method facilitates allocation of computing resources, such as memory sizes allocated to virtual machines in an enterprise computing environment. The example method includes ascertaining a first set of information characterizing one or more computing resources of the computing environment, wherein the first set of information includes information indicating allocable memory in the computing environment; determining a set of memory allocation rules applicable to the one or more virtual machines and the computing environment; and employing the first set of information and the set of memory allocation rules to automatically generate one or more indications of a portion of one or more computing resources that may be allocated to the one or more virtual machines, whereby the portion is consistent with the set of memory allocation rules.

In a more specific embodiment, the first set of information further includes information indicating a number of installed components of one or more software applications installed in the computing environment and running on the one or more virtual machines. The first set of information further includes information indicating an amount of computing resources available to the one or more virtual machines.

In the specific embodiment, the amount computing resources includes an amount of Random Access Memory (RAM). The first set of information further includes information indicating performance and sizing information characterizing existing installed components of a software application installed in the computing environment within a virtual machine, e.g., a Java Virtual Machine (JVM). The computing environment may include a computing domain, which may include a server cluster.

The memory allocation rules incorporate one or more best practices determinations pertaining to memory allocation for one or more JVMs in view of the one or more characteristics. The one or more characteristics may include an existing number of JVMs, average memory allocated to the JVMs, relative amounts (sizes) of memory allocated to each JVM, performance metrics associated with each JVM, and so on.

The set of memory allocation rules includes a set of best practices rules for mapping an existing JVM memory configuration of a computing domain to a configuration that is consistent with a set of associated best practices rules, including constraints, and/or other criteria or parameters.

The best practices rules may further incorporate scaling logic for determining a factor by which to scale an amount of memory allocated to a virtual machine in accordance with the best practices rules. The set of best practices rules may include one or more heuristics for adjusting a size of a virtual machine. The size of the virtual machine may refer to an amount of RAM to be accessible to a first virtual machine that is adapted to run within a second virtual machine. The set of best practices rules may further include or incorporate one or more product-specific virtual machine guidelines.

The example method may further include generating a report and/or control signal containing memory sizing information characterizing one or more virtual machines installed in the computing environment; and automatically adjusting memory allocated to the one or more virtual machines in accordance with the memory sizing information and the one or more best practices rules.

Hence, certain embodiments discussed herein may involve evaluating installed products and components (including software applications, components thereof, and memory), available memory resources, active JVM performance and sizing, and then apply deployment best practices and comparable statistical data to report, and optionally, to apply JVM sizing that optimizes resource utilization, system performance, and system stability in view of an updatable set of best practices rules, including scaling algorithms, guidelines, and so on.

Certain embodiments discussed herein may be implemented via a software utility that may be activated from a command line and which automates potentially complex enterprise software architecture and administration tasks. The utility may enable rapid, consistent, and accurate configuration so that the task can cost-effectively scale to a very large number of software systems.

Furthermore, the utility may add further value by virtually eliminating the need for individual application administrators to perform the manual calculations and configuration tasks required for optimal deployment. It may help to ensure consistent use of best practices and heuristic knowledge across large systems and a large number of computing environments. It may further help to ensure consistent configuration management practices, in part by automating the manner of implementation and the precise configuration specification of the JVM sizing and configuration options.

In a report mode, the utility may further provide a unique host or virtual machine-level report of active JVM and managed process sizing information, which may not be readily available otherwise. Furthermore, by providing a standardized approach to JVM sizing tasks in accordance with various embodiments discussed herein, cloud services operations teams are provided with consistent and validated configurations. Such validated configuration information enables operations teams to build consistent expectations for given JVM types and to recognize potential problems when deviations from the expectations are observed.

Accordingly, by maintaining an updatable set of best practices rules or specifications, and by employing software to evaluate JVM sizing with reference to the best practices rules to automatically generate reports or make system configuration adjustments according to embodiments discussed herein, multiple hour JVM and memory evaluation tasks (involving multiple commands and multiple interpretations) can be reduced to tasks requiring mere seconds to complete.

Hence, consistent, very large scale JVM size changes may be cost-effectively made across many types of environments. The utility may enable rapid, consistent, and accurate configurations, facilitating cost-effectively scaling the associated computing environments to a large number of software systems.

A further understanding of the nature and the advantages of particular embodiments disclosed herein may be realized by reference of the remaining portions of the specification and the attached drawings.

DETAILED DESCRIPTION OF EMBODIMENTS

Certain embodiments discussed herein reference updatable best practices information and rules to provide reports and/or control signals for reporting upon and/or automatically adjusting memory allocated to certain software components (e.g., Java Virtual Machines (JVMs) in computing environments, such as enterprise computing environments, which may include many network-distributed software components.

For the purposes of the present discussion, a Virtual Machine (VM) may be any software mechanism for containing software and affecting its operation and interaction with a surrounding computing environment, e.g., to facilitate platform independence. Virtual machines often represent software emulations or representations of real computers or computing systems (called machines).

A computing environment may be any collection of computing resources used to perform one or more tasks involving computer processing. A computer may be any processor in communication with a memory. A computing resource may be any component, mechanism, or capability or quantities thereof of a computing environment, including, but not limited to, processors, memories, software applications, user input devices, and output devices.

An enterprise computing environment may be any computing environment used for an enterprise. An enterprise may be any organization of persons, such as a business, university, government, military, and so on. The terms "organization" and "enterprise" are employed interchangeably herein.

An example enterprise computing environment includes various computing resources distributed across a network and may further include private and shared content on intranet web servers, databases, files on local hard discs or file servers, email systems, document management systems, portals, and so on. The terms "computing system" and "computing environment" may be used interchangeably herein.

Enterprise software, such as Enterprise Resource Planning (ERP) software, may be any set of computer code that is used by an enterprise or organization. Examples of enterprise software classifications include HCM (Human Capital Management) software, CRM (Customer Relationship Management) software; BI (Business Intelligence) software, and so on. Additional examples of enterprise software include web services managers, service buses, E-business suites, process managers, notification servers, domain administration software, various types of middleware, including Application Programming Interfaces (APIs), and so on.

For the purposes of the present discussion, a server may be any computing resource, such as a computer and/or software that is adapted to provide content, e.g., data and/or functionality, to another computing resource or entity that requests it, i.e., the client. A client may be any computer or system that is adapted to receive content from another computer or system, called a server. A Service Oriented Architecture (SOA) server may be any server that is adapted to facilitate providing services accessible to one or more client computers coupled to a network.

A networked computing environment may be any computing environment that includes intercommunicating computers, i.e., a computer network. Similarly, a networked software application may be computer code that is adapted to facilitate communicating with or otherwise using one or more computing resources, e.g., servers, via a network.

A networked software application may be any software application or computer code adapted to use data and/or functionality provided via one or more resources, e.g., data, memory, software functionality, etc., accessible to the software application via a network.

Enterprise software applications, including applications for implementing cloud services, are often distributed among one or more servers as part of a computing domain, also called a server domain herein. For the purposes of the present discussion, a computing domain may be any collection of one or more servers running software that is managed by a single administrative server or associated application. An example of a computing domain is a WebLogic Server (WLS) application server domain.

A cloud service may be any mechanism (e.g., one or more web services, Application Programming Interfaces (APIs), etc.) for enabling a user to employ data and/or functionality provided via a cloud. A cloud may be any collection of one or more servers. For example, certain clouds are implemented via one or more data centers with servers that may provide data, data storage, and other functionality accessible to client devices via the Internet.

For clarity, certain well-known components, such as hard drives, processors, operating systems, power supplies, Internet Service Providers (ISPs), class loaders, bytecode compliers, and so on, are not necessarily explicitly called out in the figures. However, those skilled in the art with access to the present teachings will know which components to implement and how to implement them to meet the needs of a given implementation.

Figure 1:
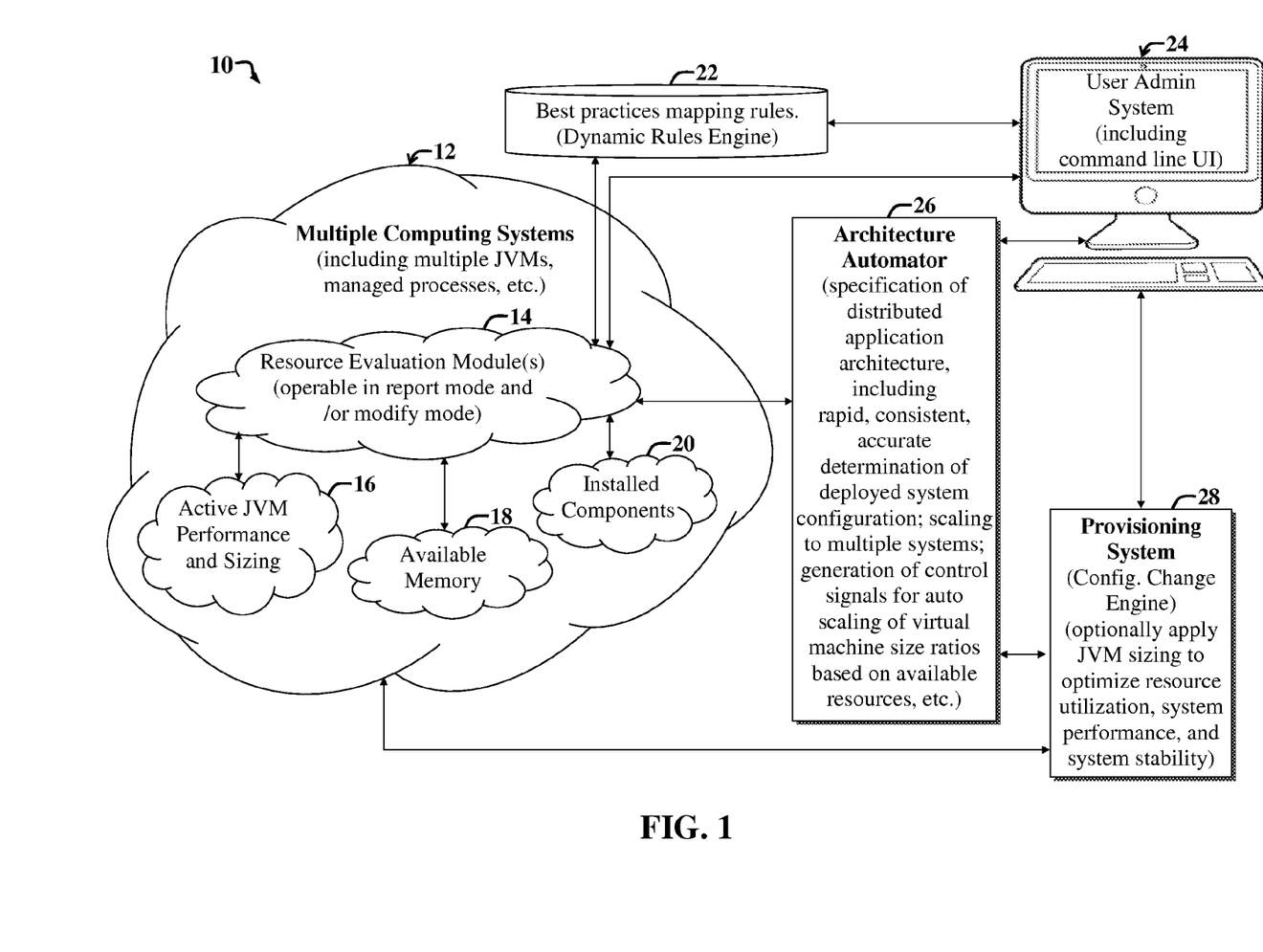
FIG. 1 is a block diagram illustrating a first example system and accompanying enterprise computing environment, which is adapted to facilitate virtual machine resource allocation reporting and configuration.

FIG. 1 is a block diagram illustrating a first example system 10 and accompanying enterprise computing environment, which is adapted to facilitate virtual machine (e.g., JVM) resource (e.g., memory) allocation reporting and configuration.

Note that, in general, groupings of various modules of the system 10 are illustrative and may vary, e.g., certain modules may be combined with other modules or implemented inside of other modules, or the modules may otherwise be distributed differently (than shown) among a network or within one or more computing devices or VMs, without departing from the scope of the present teachings.

The example system 10 includes multiple computing systems 12, including various servers that are part of a computing domain, which is administrated via an administration system 24. Servers (also called hosts herein) to be evaluated for available memory and JVM memory allocation amounts (also called JVM sizing) run resource evaluation modules 14.

For the purposes of the present discussion, the size of a JVM refers to the amount of addressable memory (e.g., RAM) being used by the JVM or otherwise allocated for use by the JVM. The allocated JVM memory may be variable within maximum and minimum levels.

The resource evaluation modules 14 include computer code for analyzing (for each server running one or more resource evaluation modules 14) active JVM performance (e.g., by referencing Key Performance Indicators (KPIs) characterizing each JVM) and sizing 16; analyzing available memory 18; and determining installed components 20. The available memory 18 may refer to memory (e.g., RAM) that is or that may be made addressable to a JVM. The installed components 20 may include information indicating which types of software components are running on different JVMs and any special memory requirements of the software components.

For the purposes of the present discussion, a key performance indicator may be any metric or indicator adapted to characterize or describe a performance of a VM in a given computing environment and for a given configuration of the VM. A configuration of the VM may be any set of information (including memory sizes) specifying or describing one or more characteristics of the VM. The one or more characteristics may affect JVM performance and operation.

The resource evaluation modules 14 communicate with a best practices mapping rules module 22, which may act as a dynamic rules engine. For the purposes of the present discussion, a dynamic rules engine may be any software and/or hardware that is adapted to apply rules based on a given input to yield an output, where the rules may be adapted over time.

In the present example embodiment, the applied rules represent best practices rules 22, which may be updated by administrators, e.g., via an administration system 24. The administration system 24 may be implemented via an administrative server. For the purposes of the present discussion, a best practices rule may be any rule, guideline, constraint, heuristic and/or algorithm specifying and/or recommending a particular memory allocation given a set of information characterizing a virtual machine for which memory is to be allocated.

The selected memory allocation (also called VM memory configuration or sizing herein) is consistent with the rules, which may include various constraints or requirements that have been determined to represent requirements to meet best practices criteria (e.g., that total maximum JVM heap sizes should not exceed 65-75% of available VM physical RAM). The terms "best practices rules" and "best practices mapping rules" are used interchangeably herein.

The best practices mapping rules module 22 may include an editable text file, whereby an administrator (either human and/or automated) may update or change criteria or constraints in accordance with new best practices determinations. The best practices mapping rules module 22 may further include product-specific (e.g., software-component specific) JVM sizing and scaling logic, JVM heap sizing heuristics and rules, and generic heuristics and rules, as discussed more fully below.

Note that the best practices rules 22 may generally incorporate lessons learned from prior and existing cloud services operations, some of which may be published e.g., in support notes or existing product-specific best practices documentation.

The resource evaluation modules 14 may further communicate with the administration system 24. The administration system 24 is adapted to enable an administrator to activate or launch software utilities implementing the resource evaluation modules 14 via a command line, e.g., a Linux or UNIX command line. The resource evaluation modules 14 may be executed via Linux or UNIX shells.

For the purposes of the present discussion, a command line entry may be any computer language statement entered into a computer via an input device and specifying a program to run and/or any additional parameters specifying how the program is to run. For example, various operating systems, such as DOS, Linux, UNIX, and so on, may support command line syntax that may be employed to specify and enter command lines to run programs in response to the command line entries.

The resource evaluation modules 14 further communicate with an architecture automator 26, which further communicates with the administration system 24. In the present example embodiment, the architecture automator 26 may act as a translation module, whereby evaluation results output by the resource evaluation modules 14 are converted or translated into control signals or instructions for use by the provisioning system 28.

Note that functionality of the architecture automator 26 may be folded into or incorporated into the resource evaluation modules 14, without departing from the scope of the present teachings. Functionality of the architecture automator 26 may further include functions for facilitating specification of distributed application architecture (characterizing the multiple computing systems 12), and for facilitating rapid, consistent, accurate determination of deployed system configuration; scaling to multiple systems; generation of control signals for automatic scaling (also called auto scaling) of virtual machine size ratios based on available resources, and so on.

For the purposes of the present discussion, software functionality may be any function, capability, or feature, e.g., stored or arranged data, that is provided via computer code, i.e., software. Generally, software functionality may be accessible via use of a user interface and accompanying user interface controls and features. Software functionality (often simply called functionality herein) may include actions, such as retrieving data pertaining to a computing object (e.g., business object); performing an enterprise-related task, such as promoting, hiring, and firing enterprise personnel, placing orders, calculating analytics, launching certain dialog boxes, performing searches, and so on.

The provisioning system 28, in combination with the architecture automator 26, may act as a configuration change engine, which includes computer code for applying JVM sizing (i.e., memory resource allocations) determinations to JVMs of the multiple computing systems 12. When a computing system is configured and JVM sizes are adjusted, the provisioning system 28 deploys (e.g., provisions by installing and running) JVMs with updated sizes, i.e., with updated amounts of (and/or portions of) memory allocated thereto.

The JVM sizing determinations forwarded from the architecture automator 26 to the provisioning system 28 indicate optimal JVM sizes to the extent that the JVM sizes are consistent with established best practices rules, e.g., as maintained by the best practices mapping rules 22. In general, for the purposes of the present discussion, optimal memory allocation may be any memory allocation that confirms to a set of best practices rules. Exact details of the best practices rules may vary and may change depending upon the needs of a given computing environment. Those skilled in the art with access to the present teachings may readily develop and update best practices rules to meet the needs of a given implementation, without undue experimentation.

The resource evaluation modules 14 and architecture automator 26 may run in various modes, including a reporting mode and a configuration mode. When the resource evaluation modules 14 are run in reporting mode (also called report mode), the modules 14 generate reports on active JVM performance and sizing 16, available computing system memory 18, installed components 20, and so on. The resulting report is accessible to the administration system 24, via which an administrator may view data in the report.

When the resource evaluation modules 14 are run in configuration mode (also called modify mode or modification mode), the report information is used by the architecture automator 26 and the provisioning system 28 to trigger changes to JVM memory allocations in the multiple computing systems 12 in accordance with the best practices mapping rules 22, as discussed more fully below.

In general, the resource evaluation modules 14 and/or architecture automator 26 may be implemented via one or more software utilities, i.e., programs, which may be run by administrators (or other authorized personnel, e.g., analysts that have accounts with software owner privileges) via middle tier hosts.

The software utility 14, 22, 26 may be adapted to run in various types of networked computing environments. For example, in environments with Oracle WebLogic Sever (WLS) clusters with managed servers on multiple tiers (MTs), utility 14, 22, 26 may advise an administrator to run the utility 14, 22, 26 on other nodes in the cluster that may not be currently running the utility 14, 22, 26.

The utility 14, 22, 26 may include computer code for further validating and/or checking whether other computing environments exist on the host and then accounting for JVMs or processes running in those environments. However, often, one domain and one computing environment are employed for each VM, and such validating functionality may be omitted or not used, without departing from the scope of the present teachings.

During the reporting mode, the utility 14, 22, 26 may instruct an administrator user (or other authorized personnel) to start application processes configured to run on a particular host; then evaluate available memory; memory used by JVMs and other managed processes; and then generate a report in response to the evaluation.

During the modification mode, domain configuration files (e.g., WebLogic domain configuration files, setDomain.env) may be updated by the architecture automator 26. The updates may include any changes to JVM startup parameters for each JVM based on available memory and best practices rules, including sizing guidelines for JVMs and managed processes.

If, during modification mode, it is not possible to meet recommended values given available memory and VM processes, then VM memory sizes (also simply called VM sizes) are scaled by a given percentage suitable to meet available memory in a manner most consistent with the best practices rules 22.

An example heuristic for JVM sizing may include checking that a computing environment is running JVMs; checking total memory (e.g., RAM) used by JVMs in the environment; calculating scale factors for JVM sizes (i.e., amounts of memory, e.g., RAM, allocated to the JVMs), and so on. For the purposes of the present discussion, a heuristic may be any method for achieving a particular task, e.g., calculating a JVM size based on contextual information and the best practices rules 22.

In the present example embodiment, the utility 14, 22, 26 is adapted to provide a user option to specify override heap size values (i.e., memory allocated) for each JVM, which may differ from generally recommended heap sizes calculated by the utility 14, 22, 26. The user option may be selected by a user via the administration system 24 and accompanying user interface.

The utility 14, 22, 26 may provide additional user options, e.g., a user option to trigger recalculation of other JVM sizes while accounting for any overridden JVM sizes (also called override values). The utility 14, 22, 26 may further check to confirm that override values meet minimum and maximum ranges based on best practices. If the user-specified override values do not meet minimum and maximum ranges, an indication of such may be displayed via the administration system 24. Alternatively, depending upon the needs of a given implementation, override values may be subsequently automatically scaled in accordance with changing characteristics of the computing environment, including the multiple computing systems 12 and the best practices rules 22.

In summary, the present example embodiment provides a standardized or consistent approach to JVM sizing and ensures that any cloud services operations teams (which may access the system 10 via the user administration system 24) are working with consistent and validated configurations in accordance with best practices rules.

Information obtained via the utility 14, 22, 26 enables such teams to build more accurate or consistent expectations for given JVM types, and further facilitates recognizing potential problems when deviations from the expectations are observed. In addition, the utility 14, 22, 26 facilitates making large scale changes across many types of computing environments while achieving consistent results. The utility 14, 22, 26 further facilitates rapidly scaling consistent and accurate configuration changes (e.g., JVM memory size adjustments) to a very large number of software systems at a much lower cost than may be conventionally achieved otherwise.

Note that the utility 14, 22, 26 may be run continuously and/or at different times, depending upon the needs of a given implementation. However the utility 14, 22, 26 may be particularly useful during provisioning of cloud services. In general, the utility 14, 22, 26 may be run by an analyst or administrator at different points in a lifecycle of a deployed suite of applications. For example, the utility 14, 22, 26 may be run when system memory is increased, or when new software products are deployed on a particular host, or when a host is added or removed from the computing environment. Running the utility 14, 22, 26 again triggers recalculation of optimal JVM sizes, which may be made available in a report, and/or JVMs may be automatically deployed with memory allocations consistent with the optimal JVM size calculations.

Use of the system 10 and accompanying utility 14, 22, 26 can be particularly beneficial to application server administrators, who may employ extensive system checklists to ensure stable runtime environments. The utility 14, 22, 26 may facilitate analysis and modification of JVM configuration accurately and consistently, and may conveniently provide important report data for inclusion in the checklists.

Furthermore, customer (e.g., cloud services customer) incidents or issues that fit a particular profile (e.g., memory swapping, poor performance, long application halts, etc.) can now be readily evaluated to determine if any gross JVM sizing errors or over allocation of heap based on available VM memory is being used.

Conventionally, cloud services operations teams may lack a set of agreed guidelines or best practice values. Furthermore, individual environment incidents involving JVM sizing analysis (recommendations, meetings, evaluation, change management, etc.) may require many hours, which may otherwise require mere seconds when using embodiments discussed herein, which incorporate consistent, yet updatable best practices rules and accompanying guidelines and values (e.g., criteria, constraints, memory limits, etc.).

Figure 2:
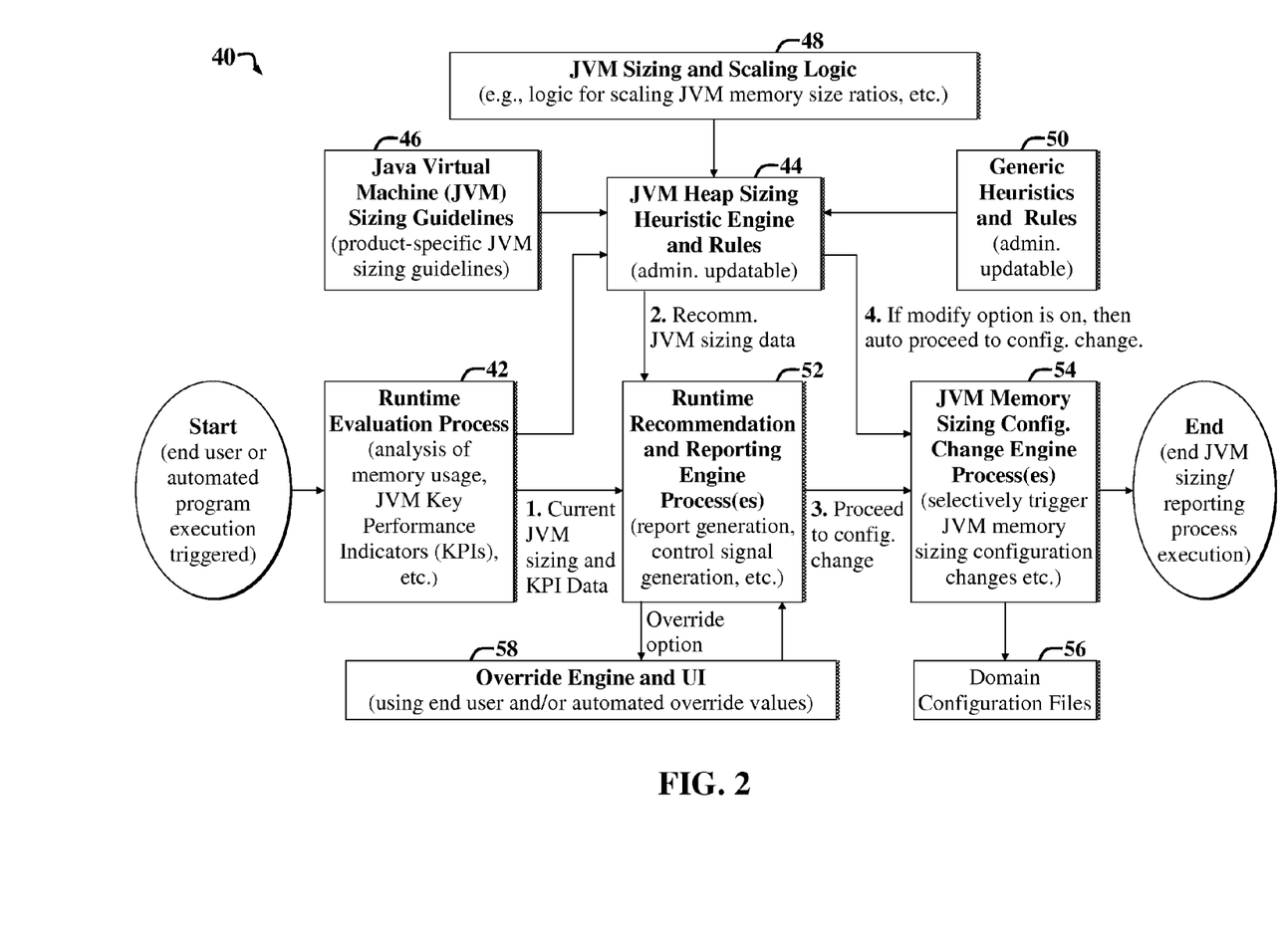
FIG. 2 is a flow diagram illustrating a first example process flow adapted for use with the example system of FIG. 1.

FIG. 2 is a flow diagram illustrating a first example process 40 flow adapted for use with the example system 10 of FIG. 1. After starting the process 40, e.g., via a particular command line entry, a runtime evaluation process 42 is executed.

The runtime evaluation process 42, which may be implemented via one or more of the resource evaluation modules 14 of FIG. 1, is adapted to provide information characterizing current JVM sizes in a computing environment, e.g., a server domain, which has been evaluated as part of the runtime evaluation process 42. Additional information, such as Key Performance Indicator (KPI) data, e.g., performance metrics characterizing the performance of different evaluated JVMs, may also be provided, e.g., as output of the runtime evaluation process 42.

The JVM sizing and KPI information provided via the runtime evaluation process 42 is accessible to a JVM heap sizing heuristics engine process 44 and a runtime recommendation and reporting engine process 52. The JVM heap sizing heuristic engine process 44 receives additional input, including JVM sizing guidelines 46 (e.g., product-specific JVM sizing guidelines), JVM sizing and scaling logic processes 48 (e.g., logic for scaling JVM memory size ratios, etc.), and administrator-updatable generic or general heuristics and rules 50. Taken together, the JVM heap sizing and heuristic engine 44 and accompanying inputs 46-50 may be implemented via the best practices mapping rules module 22 of FIG. 1.

The JVM sizing guidelines 46 include information that is adapted to facilitate dynamic (i.e., ongoing or iterative), administrator-managed additions, removal, and updating of guidelines. JVM memory allocation (i.e., JVM sizing) guidelines may be stored as tabular data, e.g., in a text file that is editable by an administrator, thereby facilitating updates to the guidelines as new best practices guidelines develop.

In general, the JVM heap sizing heuristics engine process 44 is adapted to receive inputs from the JVM sizing guidelines 46, JVM sizing and scaling logic 48, and generic heuristics and rules 50, and then to determine JVM sizing recommendations in accordance with a JVM sizing algorithm run by the JVM heap sizing heuristic engine processes 44.

The JVM heap sizing heuristic engine process 44 outputs recommended JVM size information based on the various inputs 46-50 and input from the runtime evaluation process 42 and in accordance with an underlying heuristic. Exact details of the underlying heuristic may be implementation specific and may vary. Those skilled in the art with access to the present teachings may readily determine an appropriate heuristic to meet the needs of a given implementation, without undue experimentation.

Output from the JVM heap sizing heuristic engine process 44 is provided as input to the runtime recommendation and reporting engine process 52 and, optionally, to a JVM memory sizing configuration change engine process 54. Note that the JVM memory sizing configuration change engine process 54 may be implemented via the provisioning system 28 of FIG. 1 or via a module included therein or elsewhere in the system 10.

The JVM sizing recommendations and associated data are used by the runtime recommendation and reporting engine processes 52 to generate reports and/or to issue configuration control signals to the JVM memory sizing configuration change engine processes 54. For the purposes of the present discussion, a control signal may be any conveyed information that triggers a process or action taken by that which receives the conveyed information.

In the present example embodiment, a control signal sent from the runtime recommendation and reporting engine process 52 to the JVM memory sizing configuration change engine process 54 may include information sufficient to direct the JVM memory sizing configuration change engine process 54 to initiate JVM memory sizing configuration changes to JVMs of a computing environment analyzed by the runtime evaluation process 42. The information may further specify which changes to make and how to make them.

Alternatively, the JVM heap sizing heuristic engine process 44 provides sufficient recommendations and associated information to act as a control signal for triggering the JVM memory sizing configuration change engine process 54 to implement the recommendations. In this case, if the overall process 40 has been launched with a modify option set to "on," then input from the runtime recommendation and reporting engine process 52 to the JVM memory sizing configuration change engine process 54 is not necessarily required. However, in such cases, any override values specified by the user override engine process 58 may pass through to the JVM heap sizing heuristic engine process 44 and be incorporated thereby into recommendations output thereby.

In general, whether the runtime recommendation and reporting engine processes 52 output reports and/or configuration control signals depends upon the operational mode of the associated JVM sizing utility employed to implement the overall process 40. A decision to proceed with the JVM memory sizing configuration change engine process 54 may be made by an administrator after completion of the runtime recommendation and reporting engine process 52. Alternatively, the decision to proceed or not, i.e., the setting of the operational mode, occurs before the initial runtime evaluation process 42 is launched. Such an initial mode selection may be may be specified via a command line switch in a command line entry used to launch the overall process 40.

In reporting mode, the runtime recommendation and reporting engine process 52 generates and forwards reports, which may be accessible via a user interface, e.g., an administrator user interface. In modification mode, the runtime recommendation and reporting engine process 52 forwards control signals to the JVM memory sizing configuration change engine process 54 for implementation of the JVM size changes recommended by the runtime recommendation and reporting engine process 52. Recommended JVM sizing information may be stored among domain configuration files 56 to impact the run-time JVM memory utilization of existing or newly provisioned domains.

The runtime recommendation and reporting engine process 52 may receive automated and/or user-specified (e.g., specified by an administrator) override values from an override engine process 58, which may employ a user interface (e.g., a user interface of the administration system 24 of FIG. 1) to receive any end-user and/or automated override values that pertain to JVM memory sizing. The override engine process 58 may also enable iterative updates during runtime execution of JVMs in a given computing environment.

Figure 3:
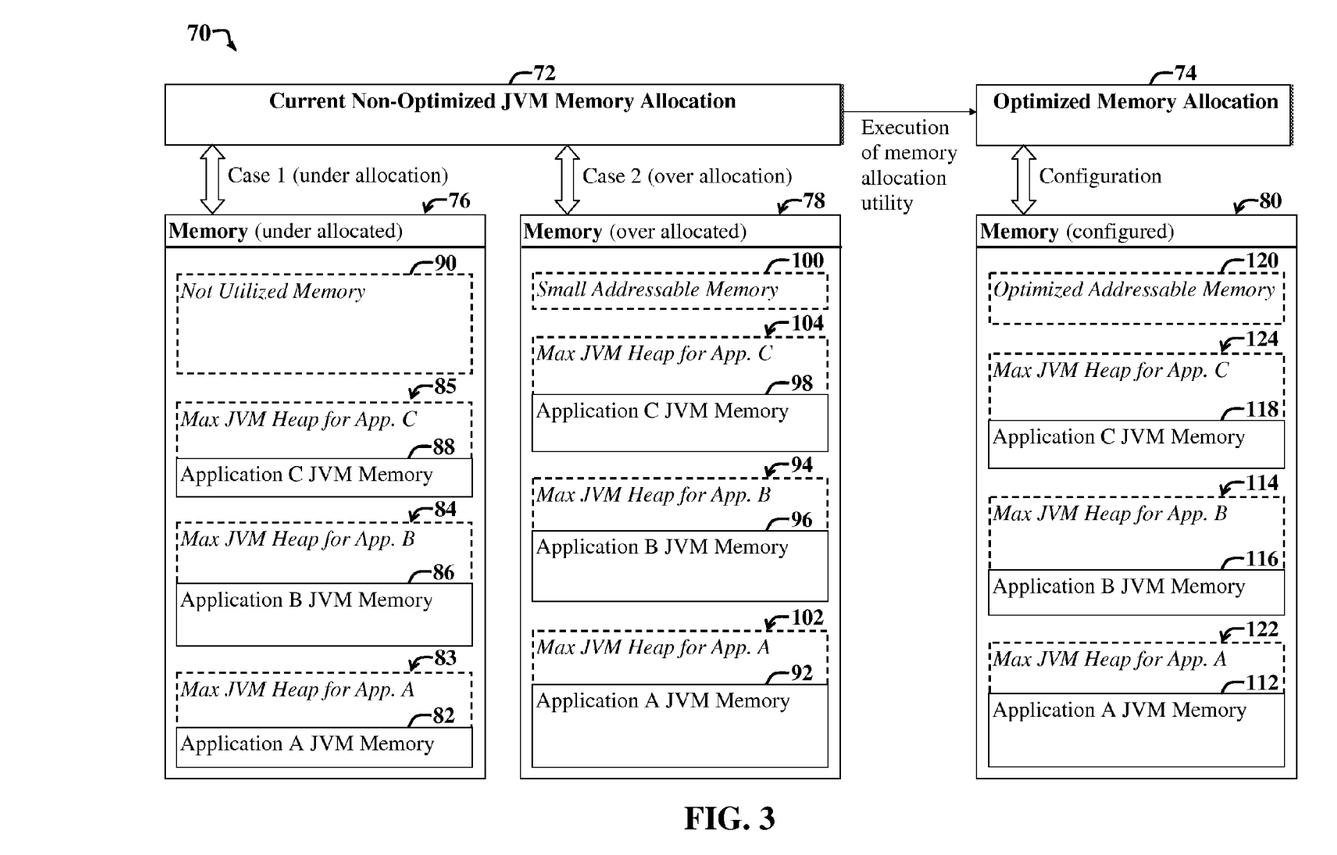
FIG. 3 is flow diagram illustrating a second example process flow illustrating example virtual machine memory allocation results produced by an embodiment of the process of FIG. 2.

FIG. 3 is flow diagram of a second example process flow 70 illustrating example virtual machine memory allocation results 80 (given different initial memory configurations 76, 78) produced by an embodiment of the process 40 of FIG. 2. The second example process flow 70 includes changing a current non-optimized JVM memory allocation configuration 72 to an optimized memory allocation 74 in response to running of the utility represented by the process 40 of FIG. 2.

Examples of non-optimized JVM memory allocations include a first memory allocation case represented by an example under allocated configuration 76. The under allocated memory configuration 76 represents total RAM of an example system, where different portions of RAM are allocated to a first application (Application A) JVM 82; to a second application (Application B) JVM 86, and third application JVM 88, which may represent components of a given software package. Memory allocated to the JVMs 82, 86, 88 are variable but are configured to not exceed respective maximum heap sizes 83, 84, 85.

As configured, the total addressable memory 76, e.g., which may be made available to user space applications, includes a relatively large portion of non-utilized memory 90. This non-utilized memory 90 represents wasted memory (also called wasted space), to the extent that it will not be utilized and may represent a lost opportunity to increase application performance, throughput, and/or capacity. Accordingly, the memory configuration 76 is said to be under allocated.

A second memory allocation case is represented by an example over allocated configuration 78. The over allocated memory configuration 78 represents total RAM of an example system (which may represent the same system as represented by the under allocated configuration 76). Different portions of the RAM represented by the over allocated memory configuration 78 are allocated for a first virtual machine 92, a second virtual machine 96, and a third virtual machine 98.

The virtual machines 92, 96, 98 exhibit variable memory usages, which are limited in size by maximum heap sizes 102, 94, 104 respectively. Note that the JVM memory sizes 92, 96, 98 and respective maximum heap sizes 102, 94, 104 are larger than the corresponding memory sizes 82, 86, 88 and respective maximum heap sizes 83, 84, 85 of the under allocated configuration 76.

The over allocated memory configuration 78 is left with very small addressable memory 100. This may result in process swapping, whereby hard drive (or solid state drive)

memory may be utilized when applications exceed allocated RAM. Swapping may substantially degrade runtime performance of the total system (when under load) and accompanying applications, e.g., applications corresponding to the first JVM allocation 92, 102 second JVM allocation 94, 96, and third JVM allocation 98, 104.

In general, the memory allocations corresponding to the configurations 76, 78 represent non-optimal configurations, which may result from default JVM sizing, single or multiple JVM heap sizing decisions made without a holistic system optimization system or method incorporating best practices guidelines in accordance with an embodiment discussed herein.

Upon running of a software utility in accordance with embodiments discussed herein, non-optimal configurations 76, 78, are converted to an optimal configuration 80 by the utility. The optimal memory configuration 80 conforms to best practices rules, including guidelines, best practices heuristics, and so on.

The optimal memory configuration 80 represents optimized free RAM, which has been optimized in accordance with the best practices rules for sustained stability, performance, and so on, to meet the needs of a given implementation and accompanying computing environment. The optimal memory configuration 80 includes a first application JVM memory allocation 112 limited by a first maximum heap size 122; a second application JVM memory allocation 116 limited by a second maximum heap size 114, and a third application JVM memory allocation 118 limited by a third maximum heap size 124. An optimized addressable memory 120 is left over and has been optimized to limit system performance degradation due to swapping, enhance system stability, and so on, in accordance with best practices rules, which may include implementation specific rules and guidelines.

In general, the various memory allocations 76-80 may represent memory available to physical systems, e.g., servers or server clusters, or memory available to virtualized servers that run various virtual machines within the virtual servers.

In general, a server running on or represented by a virtual machine is said to be virtualized. For the purposes of the present discussion, a virtualized computing process or application may be a process or application that is associated with a layer of abstraction, called a virtual machine, that decouples, at least in part, physical hardware from the process or application. A virtual machine may have so-called virtual hardware, such as virtual RAM, Network Interface Cards (NICs), and so on, upon which virtualized applications, such as operating systems and servers, are loaded. The virtualized computing processes may employ a consistent virtual hardware set that is substantially independent of actual physical hardware.

Note that the servers may be fully virtualized machines, but need not be. For the purposes of the present discussion, a fully virtualized machine may be any virtualized machine that provides a substitute for a real machine (in terms of functionality offered) and includes functionality for executing an operating system. A process virtual machine may be any virtual machine that is adapted to execute a single computer program or component by providing a fully or partially platform-independent program execution environment. In the present example embodiments, various virtual machines running applications (e.g., applications A, B, and C shown in FIG. 3) represent process virtual machines.

Figure 4A:
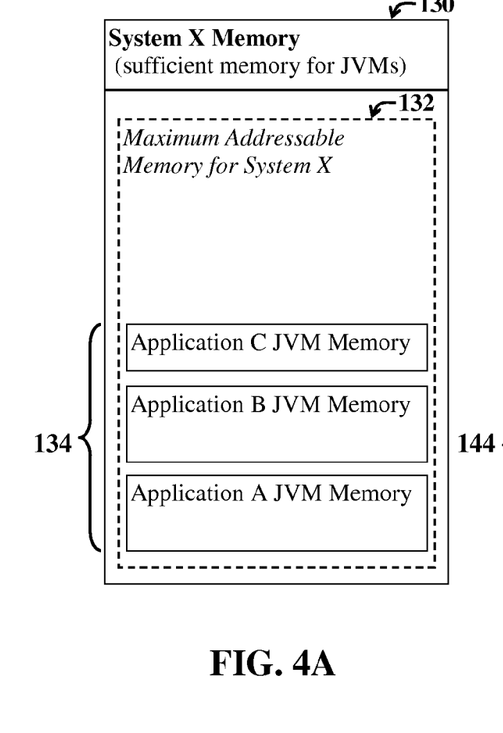
FIG. 4A shows a first example memory allocation that may result from use of one or more of the embodiments of FIGS. 1-3 for a particular use case.
Figure 4B:
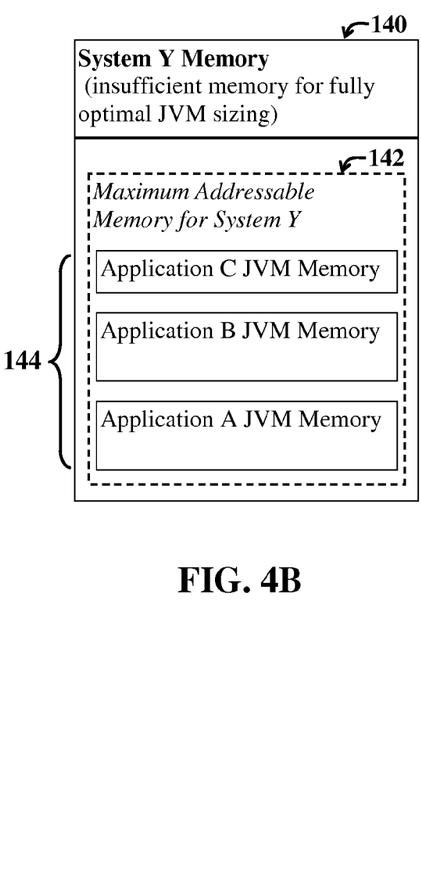
FIG. 4B shows a second example memory allocation that may result from use of one or more of the embodiments of FIGS. 1-3 for a particular use case.
Figure 4C:
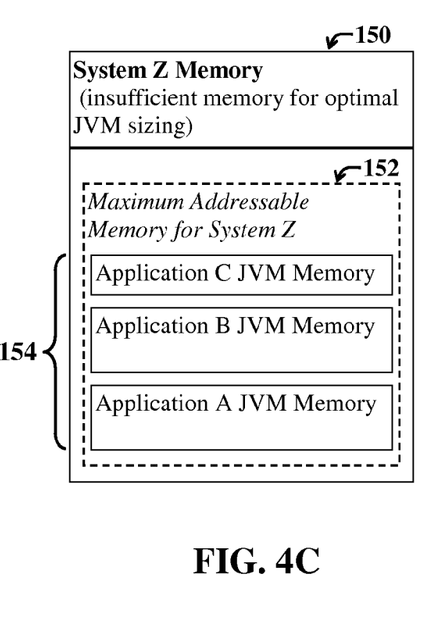
FIG. 4C shows a third example memory allocation that may result from use of one or more of the embodiments of FIGS. 1-3 for a particular use case.

FIG. 4A shows a first example memory allocation 130 (also called configuration herein) that may result from use of one or more of the embodiments of FIGS. 1-3 for a particular use case. In general, example memory allocations of FIGS. 4A-4C provide three example outcomes after running a JVM memory configuration utility in accordance with embodiments discussed herein (e.g., the embodiments of FIGS. 1-3). The three different systems have equivalent application JVMs, but have variable addressable RAM.

In the use case represented by the first allocation 130 of FIG. 4A, the associated system (system X) has sufficient maximum addressable memory 132 to accommodate default or initial JVM allocations 134. The initial default JVM allocations 134 are sized to meet best practices rules. No memory size scaling is required, as the associated system has sufficient RAM to accommodate the initial allocations 134.

FIG. 4B shows a second example memory allocation 140 that may result from use of one or more of the embodiments of FIGS. 1-3 for a particular use case.

In the use case represented by the second allocation 140 of FIG. 4B, the associated system (system Y) has insufficient addressable RAM 142 to size each application JVM type, such that the JVM allocation 144 does not meet full best practices rules, e.g., best practice sizing criteria, required to retain sufficient free space (e.g., freely addressable RAM) to meet best practices guidelines.

Accordingly, upon running a JVM sizing utility in accordance with embodiments discussed herein, the JVM sizes 144 have been scaled down to maintain sizing ratios specified by best practices rules, including guidelines and associated values.

FIG. 4C shows a third example memory allocation 150 that may result from use of one or more of the embodiments of FIGS. 1-3 for a particular use case.

In the use case represented by the third allocation 140 of FIG. 4C, the associated system (system Z) has insufficient memory 152 for optimal JVM sizing. Accordingly, the allocated JVM sizing 154 is not scaled down, as this would violate minimum best practices sizing rules. Hence, a JVM sizing utility may not necessarily make any changes to the configuration 150. This may call for manual analysis for errors in overall system design.

Figure 5:
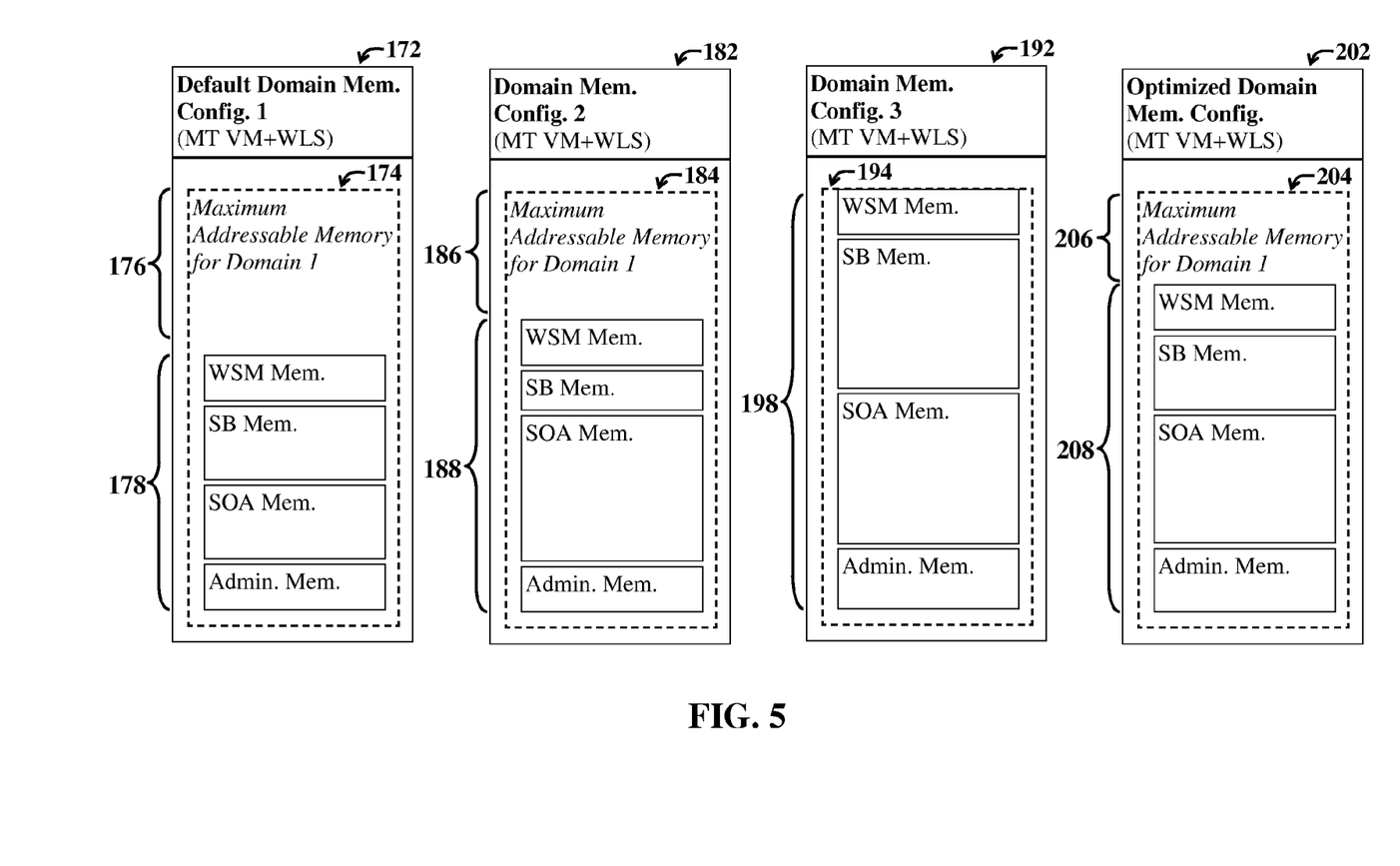
FIG. 5 is a diagram juxtaposing example results of virtual machine sizing activities performed via conventional mechanisms and those performed via an embodiment constructed in accordance with the present teachings.

FIG. 5 is a diagram juxtaposing example results (i.e., an optimized domain memory configuration 202) of virtual machine sizing activities and associated memory allocations 172-192 performed via conventional mechanisms and a memory allocation 202 performed via an embodiment constructed in accordance with the present teachings.

In the present example embodiment, a software utility constructed in accordance with an embodiment of FIG. 1 or 2 is applied to an Oracle WebLogic domain, which includes multiple enterprise application Middle Tier (MT) running WebLogic Server (WLS) application server, each running various Virtual Machines (VMs). A default memory allocation 178 for the VMs is allocated for a Web Services Manager (WSM), Service Bus (SB), Service Oriented Architecture (SOA) server, and an administration package, which may form part of a cloud services deployment.

In a first domain memory configuration 172, default VM memory allocations 178 represent a relatively small portion of maximum addressable memory 174, leaving too much memory 176 unavailable to the VMs of the allocations 178. This may lead to out-of-memory errors, poor overall system and VM performance, and poor system and VM stability.

In a second domain memory configuration 182, more memory has been allocated for a VM allocation 188, but the allocation 188 remains a relatively small percentage of total addressable memory 184, leaving a relatively large portion of unused (i.e., unallocated) memory 186. The second domain memory configuration 182 may represent example results of a conventional ad-hoc mis-allocation (e.g., made in response to customer incidents, implementer comments, etc.), and may represent a non-comprehensive and ill-advised allocation, to the extent that the large remaining portion of unused memory 186 includes substantial wasted memory.

In a third domain memory configuration 192, a third VM memory allocation 198 consumes all addressable memory 194. This over allocation may lead to problematic hard drive swapping, poor system performance, and so on.

A fourth domain memory configuration 202 represents results of applying a software utility in accordance with an embodiment herein to the domain (domain 1) associated with the first three mis-allocations 172, 182, 192. The utility has automatically adjusted VM allocations to yield optimal VM allocations 208, where the allocations 208 are called "optimal" to the extent that they conform to a set of best practices rules, e.g., for yielding consistent and stable system performance. The optimal allocations 208 represent an optimal portion of total addressable memory 204, leaving an optimal amount of available unallocated memory 206.

In the present specific embodiment, the utility is configured so that all of the allocated memory 208 is kept under a certain percentage of the total maximum addressable memory 204. For example, a best practices rule may indicate that the percentage of allocated memory be less than approximately 60% of the maximum addressable memory for the domain.

Note that modern enterprise application architectures require multiple VM processes colocated and running in tandem on the same host or virtual host or domain. Determining the optimal sizing and configuration of the VMs can be an important and complex task required to ensure optimal use of available primary memory resources, optimal application performance given available resources, and system stability.

Note that conventionally, VM sizing decisions, e.g., made in response to incidents or issues, are often not made in view of complete computing environment context information and without sufficient guidance or understanding to ensure accurate VM sizing decisions. Such errors may be compounded by multiple configuration options, leading to inconsistent and/or incompatible computing environments and associated JVM configurations.

For example, through the process of "cloud services implementation," an end package (e.g., suite of applications deployed as a set of cloud services) may be repeatedly customized or modified (e.g., via configuration changes, patches, etc.) to meet the needs of a customer. Conventionally, VM sizing may be repeatedly manually adjusted, which may yield a collection of disjoint non-optimal decisions made with the proper overall computing environment context. The resulting configuration may be time consuming and costly to deploy and may lead to non-optimal VM sizing, resulting in underutilization of expensive computing resources, poor application performance and/or system instability, and so on.

Use of embodiments discussed herein may yield substantial benefits, including reductions in errors, time savings during provisioning, enhanced awareness of system memory allocations, improved incident troubleshooting, enhanced overall system performance, more consistent deployments, and so on.

Figure 6:
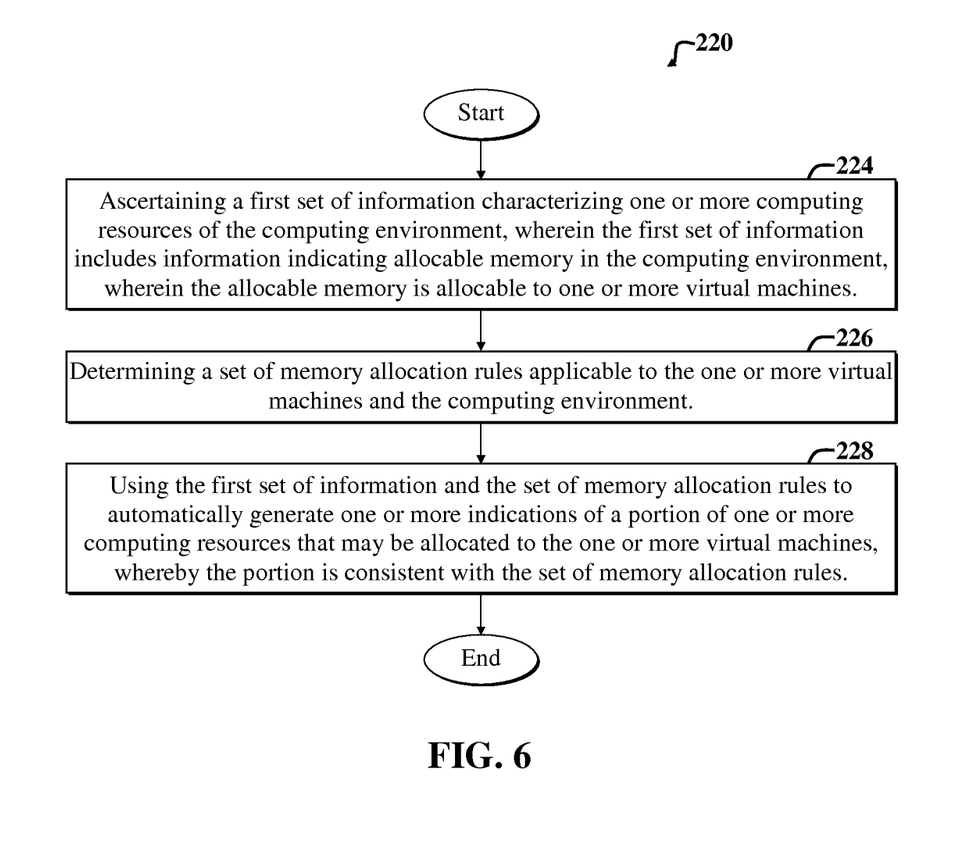
FIG. 6 is a flow diagram of a first example method adapted for use with the embodiments of FIGS. 1-5.

FIG. 6 is a flow diagram of a first example method 220 adapted for use with the embodiments of FIGS. 1-5. The example method 220 represents a method for facilitating computing resource allocation in a computing environment.

The first example method 220 includes and includes an initial configuration evaluation step 224, which involves ascertaining a first set of information characterizing one or more computing resources of the computing environment. The first set of information includes information indicating memory in the computing environment that may be allocated to one or more VMs.

A second rules-determination step 226 includes determining a set of memory allocation rules, i.e., best practices rules, applicable to the one or more VMs and the computing environment.

A subsequent allocation step 228 includes employing the first set of information and the set of memory allocation rules to automatically generate one or more indications of a portion (e.g., an amount of memory, also called memory size) of one or more computing resources (e.g., RAM) that may be allocated to the one or more VMs. The portion of resources represents a resource allocation that is consistent with the set of memory allocation rules.

Note that the method 220 may be modified without departing from the scope of the present teachings. For example, the method 220 may be augmented to specify that the first set of information further includes information indicating a number of installed components of one or more software applications installed in the computing environment.

The first set of information may further include information indicating an amount of computing resources available to the one or more VMs. The first set of information may further include information indicating performance and sizing information characterizing existing installed components (which may be installed in VMs) of a software application installed in the computing environment.

The memory allocation rules may represent a set of best practices mapping rules (also simply called best practices rules) that incorporate scaling logic for determining a factor by which to scale an amount of memory allocated to a virtual machine in accordance with the best practices mapping rules. The best practices mapping rules may further include one or more heuristics for adjusting a size of a virtual machine, where the size of the virtual machine includes an amount of RAM to be accessible to the first virtual machine.

In certain embodiments, the first virtual machine may be adapted to run with a second virtual machine. For example, the computing domain (domain 1) associated with the memory configurations 172, 182, 192, 202 of FIG. 5 may itself be implemented via a virtual machine, such as a fully virtualized server.

The method 220 may be further augmented to include a step of employing the first set of information and the set of memory allocation rules to generate a report containing memory sizing information characterizing one or more virtual machines installed in the computing environment. Another step may involve determining if the underlying software utility for performing the method is configured for a modification mode, and then automatically adjusting memory allocated to the one or more VMs in accordance with the one or more indications, wherein the indications may represent control signals that are usable by a provisioning system (or other configuration change engine) to make changes to a memory configuration pertaining to the one or more VMs running in the computing environment.

Figure 7:
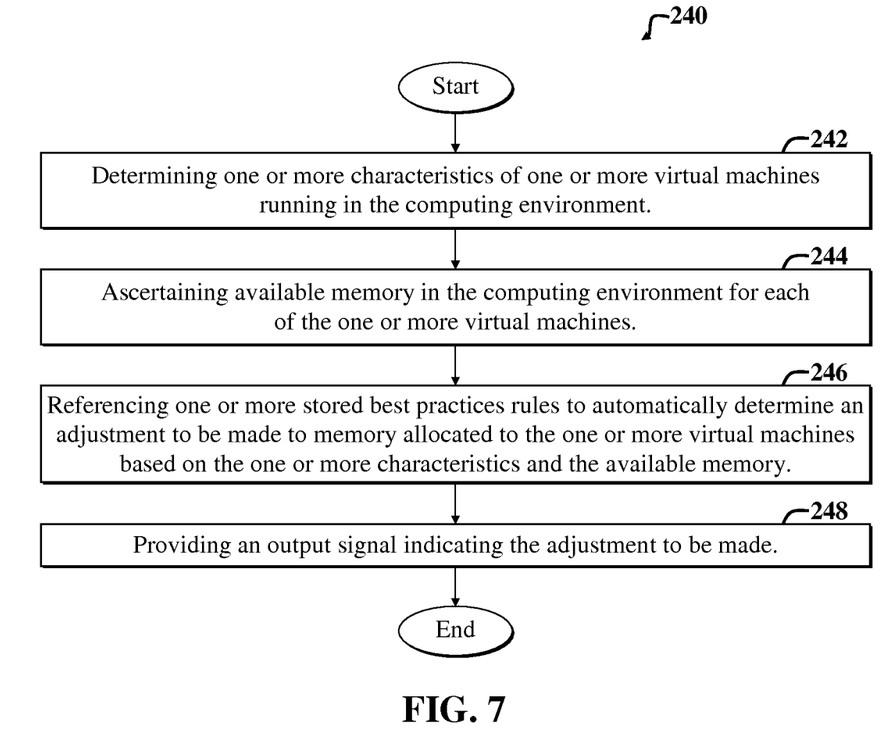
FIG. 7 is a flow diagram of a second example method adapted for use with the embodiments of FIGS. 1-6.

FIG. 7 is a flow diagram of a second example method 240 adapted for use with the embodiments of FIGS. 1-6. The second example method 240 facilitating ascertaining memory sizing for use by software running in an enterprise computing environment.

The second example method 240 includes a first step 242, which includes determining one or more characteristics of one or more VMs running in the computing environment.

A second step 244 includes ascertaining available memory in the computing environment for each of the one or more VMs.

A third step 246 includes referencing one or more stored best practices rules to automatically determine an adjustment to be made to memory allocated to the one or more VMs based on the one or more characteristics and the available memory.

A fourth step 248 includes providing an output signal indicating the adjustment to be made.

The second example method 240 may be modified, without departing from the scope of the present teachings. For example, the method 240 may further include running software for implementing the method via a utility installed on each server of a computing domain of the enterprise computing environment, wherein the utility is responsive to a command line entry.

The second example method 240 may further include providing a user option to adjust the output signal by adjusting the one or more best practices rules. A second user option may enable a user to override an automatically determined adjustment, thereby enabling a user to specify an adjustment that is different than an automatically determined adjustment made via the referencing step.

The output signal may include a report specifying one or more memory sizing adjustments that may be applied to size each of the one or more VMs. In addition, or alternatively, the output signal may include a control signal sufficient to trigger a provisioning system to install and run a software application and one or more VM components thereof in a computing domain.

The first step 242 may further include evaluating a computing domain of the enterprise computing environment to identify the one or more VMs in the enterprise computing environment; memory used by the one or more VMs; one or more VM Key Performance Indicators (KPIs); memory that may be made accessible to the one or more VMs, and so on. The one or more characteristics may include memory currently allocated to each of the one or more VMs, which may be JVMs.

The one or more best practices rules may include information specifying JVM memory allocation guidelines for allocating memory to a JVM in view of information characterizing the computing environment and the one or more characteristics of the one or more VMs. The best practices rules further include one or more heuristics defining a method for assigning memory to the JVM. The best practices rules further include computer code specifying one or more rules for scaling memory size associated with the JVM relative to one or more other JVMs running in the same computing domain as the JVM.

The second example method 240 may further include employing the output signal to automatically calculate and memory sizes for multiple JVMs running in the enterprise computing environment, which includes plural computing domains; and employing the output signal as a control signal to a provisioning system, wherein the provisioning system is adapted to adjust memory sizes of the one or more VMs of the computing environment in accordance with the control signal.

Note that in general, a software utility used to implement various methods discussed herein may be run from a Linux or UNIX command line as a middle tier software owner, but embodiments are not limited thereto. Help options may be provided to describe available command-line arguments and their impact on the function of the utility.

The utility may be adapted to determine if clusters are configured in the computing domain, and to then advise the user to run the utility on any other hosts in the cluster identified by the utility.

The utility may selectively output reports that include the names of JVMs analyzed, amounts of memory allocated thereto, maximum heap sizes, and so on.

The utility may further provide flexibility to match variations in managed server naming due to provisioning process variations with the server name in the sizing recommendation table/rules (e.g., best practices rules).

The utility may further determine if there are multiple environments on the same VM, and then advise that user accordingly, e.g., if the given implementation of the utility does not support analysis in such environments.

The utility may further provide features allowing the user to run the utility in an "advising" mode, wherein the user may be prompted, for example, to acknowledge they are taking responsibility for understanding all components on the VM being resized or configured, and that the utility may recommend changes which will cause instability or JVM failure.

The utility may determine the total physical RAM available on the host and/or associated VMs; determine the number and type of managed processes configured to run on the host and/or VMs, even if managed processes are not currently running; then calculate estimated memory consumption of managed processes based on instance types and count. Based on such environment review, a report may be printed, wherein the report indicates the current memory configuration and associated computing environment characteristics.

JVM sizing updates recommended when in report mode or specified when in modification mode, may specify when minimum and maximum VM heap sizes are equal, and then provide user options for allowing users to enter over-ride values for the maximum heap size of each JVM; then recalculate sizing and determine if the new allocation(s) exceeds memory utilization limits of, for example, approximately 70%.

The utility may constrain the user override heap values (i.e., sizes) to, for example, a minimum value of 1 gigabyte and maximum value of 8 gigabytes.

The utility may be adapted or extended, e.g., to incorporate product/application-specific requirements and/or guidelines and to incorporate updates to the JVM sizing guidelines (i.e., best practices rules) and addition of new sets of best practices rules and accompanying guidelines, which may be specified by or categorized by JVM name and type.

When the utility is in report mode, it may display additional user-defined JVM startup options, giving users added flexibility to evaluate any non-standard or options that may indicate previous memory sizing tuning efforts.

Although the description has been described with respect to particular embodiments thereof, these particular embodiments are merely illustrative, and not restrictive.

For example, while certain embodiments discussed herein pertain to JVM sizing adjustments, embodiments are not limited thereto. For example, embodiments discussed herein may readily be adapted to facilitate implementing various computing environment configuration adjustments, not limited to JVM sizing and not limited to enterprise computing environments. VMs other than JVMs may be employed; different best practices rules may be employed, and so on, without departing from the scope of the present teachings.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other tangible media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for facilitating computing resource allocation in a computing environment, the computing environment including one or more computing domains with one or more servers, wherein the one or more servers execute a software utility, the software utility executing steps of the method, the method comprising:

ascertaining a first set of information characterizing one or more computing resources of the computing environment, wherein the first set of information includes information indicating allocable memory in the computing environment, wherein the allocable memory is allocable to two or more virtual machines;

determining a set of memory allocation rules applicable to the two or more virtual machines and the computing environment;

automatically generating one or more indications of a portion of one or more computing resources that may be allocated to the two or more virtual machines without require portions of at least two of the virtual machines to be the same size based on the first set of information and the set of memory allocation rules, whereby the portion is consistent with the set of memory allocation rules, wherein the set of memory allocation rules include a set of best practices mapping rules and wherein the best practices mapping rules incorporate scaling logic for determining a factor by which to scale an amount of memory allocated to a virtual machine in accordance with the best practices mapping rules; and if a minimum best practices sizing rule is not violated, then increasing free random access memory (RAM) for a system that includes one or more of the virtual machines by scaling down size of the one or more of the virtual machines in the system; and if the minimum best practices sizing rule would be violated, then not increasing the free RAM, wherein the minimum best practices sizing rule pertains to whether there is sufficient addressable RAM to size each application Java Virtual Machine (JVM) type, and wherein the automatically generating of the one or more indications of the portions and the increasing of the free random access memory are performed outside of computing systems executing the two or more virtual machines.

2. The method of claim 1, wherein the first set of information further includes information indicating a number of installed components of one or more software applications installed in the computing environment.

3. The method of claim 2, wherein the first set of information further includes information indicating an amount of computing resources available to the two or more virtual machines.

4. The method of claim 3, wherein the amount computing resources includes an amount of Random Access Memory (RAM).

5. The method of claim 2, wherein the first set of information further includes information indicating performance and sizing information characterizing existing installed components of a software application installed in the computing environment.

6. The method of claim 5, wherein one or more of the installed components are installed within a virtual machine.

7. The method of claim 1, wherein the two or more virtual machines include two or more Java Virtual Machines (JVMs).

8. The method of claim 7, wherein the memory allocation rules incorporate one or more best practices determinations pertaining to memory allocation for one or more JVMs.

9. The method of claim 7, wherein the computing environment includes a computing domain.

10. The method of claim 9, wherein the computing domain includes a WebLogic Server domain.

11. The method of claim 1, wherein the set of best practice mapping rules include one or more heuristics for adjusting a size of a virtual machine.

12. The method of claim 11, wherein the size of the virtual machine includes an amount of RAM to be accessible to a first virtual machine that is adapted to run within a second virtual machine.

13. The method of claim 1, wherein the set of best practices mapping rules include one or more product-specific virtual machine guidelines.

14. The method of claim 1, wherein using the first set of information and the set of memory allocation rules further includes generating a report containing memory sizing information characterizing the two or more virtual machines installed in the computing environment.

15. The method of claim 1, wherein using the first set of information and the set of memory allocation rules further includes automatically adjusting memory allocated to the two or more virtual machines in accordance with the one or more indications.

16. The method of claim 15, further including generating a signal usable by a provisioning system, wherein the provisioning system is adapted to make one or more changes to a memory configuration pertaining to the two or more virtual machines running in the computing environment.

17. An apparatus comprising: a digital processor coupled to a display and to a processor-readable storage device, wherein the processor-readable storage device includes one or more instructions executable by the digital processor to perform the following acts:

ascertaining a first set of information characterizing one or more computing resources of a computing environment, wherein the first set of information includes information indicating allocable memory in the computing environment, wherein the allocable memory is allocable to two or more virtual machines;

determining a set of memory allocation rules applicable to the two or more virtual machines and the computing environment;

automatically generating one or more indications of a portion of one or more computing resources that may be allocated to the two or more virtual machines without require portions of at least two of the virtual machines to be the same size based on the first set of information and the set of memory allocation rules, whereby the portion is consistent with the set of memory allocation rules, wherein the set of memory allocation rules include a set of best practices mapping rules and wherein the best practices mapping rules incorporate scaling logic for determining a factor by which to scale an amount of memory allocated to a virtual machine in accordance with the best practices mapping rules; and if a minimum best practices sizing rule is not violated, then increasing free random access memory (RAM) for a system that includes one or more of the virtual machines by scaling down size of the one or more of the virtual machines in the system; and if the minimum best practices sizing rule would be violated, then not increasing the free RAM, wherein the minimum best practices sizing rule pertains to whether there is sufficient addressable RAM to size each application Java Virtual Machine (JVM) type, and wherein the automatically generating of the one or more indications of the portions and the increasing of the free random access memory are performed outside of computing systems executing the two or more virtual machines.

18. A non-transitory processor-readable storage device including instructions executable by a digital processor, the processor-readable storage device including one or more instructions for:

ascertaining a first set of information characterizing one or more computing resources of a computing environment, wherein the first set of information includes information indicating allocable memory in the computing environment, wherein the allocable memory is allocable to two or more virtual machines;

determining a set of memory allocation rules applicable to the two or more virtual machines and the computing environment;

automatically generating one or more indications of a portion of one or more computing resources that may be allocated to the two or more virtual machines without require portions of at least two of the virtual machines to be the same size based on the first set of information and the set of memory allocation rules, whereby the portion is consistent with the set of memory allocation rules, wherein the set of memory allocation rules include a set of best practices mapping rules and wherein the best practices mapping rules incorporate scaling logic for determining a factor by which to scale an amount of memory allocated to a virtual machine in accordance with the best practices mapping rules; and if a minimum best practices sizing rule is not violated, then increasing free random access memory (RAM) for a system that includes one or more of the virtual machines by scaling down size of the one or more of the virtual machines in the system; and if the minimum best practices sizing rule would be violated, then not increasing the free RAM, wherein the minimum best practices sizing rule pertains to whether there is sufficient addressable RAM to size each application Java Virtual Machine (JVM) type, and wherein the automatically generating of the one or more indications of the portions and the increasing of the free random access memory are performed outside of computing systems executing the two or more virtual machines.

19. The method as recited by claim 1, wherein the minimum best practices sizing rule pertains to whether sizing ratios of JVMs can be maintained.

* * * * *

UNITED STATES PATENT AND TRADEMARK OFFICE
CERTIFICATE OF CORRECTION

PATENT NO. : 9,946,573 B2  
APPLICATION NO. : 14/717290  
DATED : April 17, 2018  
INVENTOR(S) : McDermott Page 1 of 1

It is certified that error appears in the above-identified patent and that said Letters Patent is hereby corrected as shown below:

In the Claims

In Column 21, Line 16, in Claim 11, delete "practice" and insert -- practices --, therefor.

Signed and Sealed this
Twenty-eighth Day of August, 2018

Andrei Iancu
*Director of the United States Patent and Trademark Office*